United States Patent

Doornhein et al.

[11] Patent Number: 6,078,360
[45] Date of Patent: Jun. 20, 2000

[54] TELEVISION SIGNAL COMPRISING ADDITIONAL DATA

[75] Inventors: Laurens Doornhein; Marcellinus J. J. C. Annegarn, both of Eindhoven, Netherlands

[73] Assignee: U.S. Philips Corporation, New York, N.Y.

[21] Appl. No.: 08/837,865

[22] Filed: Apr. 29, 1997

[30] Foreign Application Priority Data

May 1, 1996 [EP] European Pat. Off. ............. 96201200

[51] Int. Cl.⁷ .................................................. H04N 7/08
[52] U.S. Cl. .......................... 348/473; 348/553; 348/429; 348/461; 348/465
[58] Field of Search ..................... 348/473, 553, 348/554, 466, 474, 429, 461, 465, 464, 463, 467, 468; H04N 7/08

[56] References Cited

U.S. PATENT DOCUMENTS

| | | | |
|---|---|---|---|
| 4,554,584 | 11/1985 | Elam et al. | 358/165 |
| 5,387,942 | 2/1995 | Lemelson | 348/553 |
| 5,453,794 | 9/1995 | Ezaki | 348/465 |
| 5,483,289 | 1/1996 | Urade et al. | 348/468 |
| 5,512,954 | 4/1996 | Shintani | 348/468 |
| 5,587,743 | 12/1996 | Montgomery et al. | 348/473 |
| 5,617,148 | 4/1997 | Montgomery | 348/473 |
| 5,621,471 | 4/1997 | Kim et al. | 348/473 |
| 5,627,592 | 5/1997 | Tichelaar et al. | 348/429 |
| 5,654,764 | 8/1997 | Suh | 348/465 |
| 5,659,368 | 8/1997 | Landis | 348/467 |
| 5,663,766 | 9/1997 | Sizer, II | 348/473 |
| 5,668,917 | 9/1997 | Lewine | 348/460 |
| 5,686,966 | 11/1997 | De La Cierva, Sr. | 348/461 |
| 5,708,476 | 1/1998 | Myhrvold et al. | 348/473 |
| 5,734,432 | 3/1998 | Netravali et al. | 348/461 |
| 5,751,335 | 5/1998 | Shintani | 348/460 |

Primary Examiner—John K. Peng
Assistant Examiner—Jean W. Désir
Attorney, Agent, or Firm—Edward W. Goodman

[57] ABSTRACT

A television signal includes a video signal having at least luminance information and a signalling bit stream for conveying static control information bits relating e.g. to at least an aspect ratio of the video signal, in which a plurality of bits of an additional data signal are distributed over at least one bit of the signalling bit stream per frame of the video signal, whereby the signalling bit stream contains at least one varying bit in addition to the static control information bits.

13 Claims, 2 Drawing Sheets

TELEVISION SIGNAL COMPRISING ADDITIONAL DATA

BACKGROUND OF THE INVENTION

1. Field of the Invention

The invention relates to a method and apparatus for generating or receiving a television signal comprising additional data, and to the television signal comprising the additional data.

2. Description of the Related Art

WO 94/28678, corresponding to U.S. Pat. No. 5,627,592 (Attorney's docket PHN 14,478) discloses an extended television signal comprising signalling bits for conveying control information to control an extended television signal decoder. As can be seen from FIG. 11 of WO 94/28678, the signalling bits contain a series of bits conveyed in a first half of line 23 of the television signal, namely, after a run-in and a start code, 4 static bits to indicate the aspect ratio, 1 static bit to indicate camera mode or film mode, 3 reserved bits, 3 static bits to indicate subtitle information, and 3 reserved bits. The expression "static bits" means that in each frame, the same bits are transmitted until a new situation occurs which necessitates a change of at least one of these bits.

SUMMARY OF THE INVENTION

It is, inter alia, an object of the invention to provide a data transmission facility to convey data with a television signal. To this end, a first aspect of the invention provides a method of generating a television signal with additional data, comprising the steps of generating a video signal having at least luminance information; generating static control information bits; providing an additional data signal having a plurality of bits; distributing said plurality of bits over at least one bit per frame of said video signal; combining said static control information bits and said at least one bit to obtain a signalling bit stream containing at least one varying bit in addition to said static control information bits; and combining said signalling bit stream and said video signal to obtain said television signal with additional data. A second aspect of the invention provides a television signal with additional data, comprising a video signal having at least luminance information and a signalling bit stream for conveying static control information bits; and a plurality of bits of an additional data signal distributed over at least one bit of said signalling bit stream per frame of said video signal, whereby said signalling bit stream contains at least one varying bit in addition to said static control information bits. A third aspect of the invention provides a storage means, for example, a video tape, a CD-I, or a Digital Versatile (or Video) Disc (DVD), comprising the above television signal. A fourth aspect of the invention provides an apparatus for generating the above television signal with additional data. A fifth aspect of the invention provides a method of receiving and processing the above television signal with additional data. A sixth aspect of the invention provides an apparatus for receiving and processing the above television signal with additional data.

A primary aspect of the invention provides a television signal with additional data, comprising:

a video signal having at least luminance information and a signalling bit stream for conveying static control information bits; and a plurality of bits of an additional data signal distributed over at least one bit of the signalling bit stream per frame of the video signal, whereby said signalling bit stream contains at least one varying bit in addition to said static control information bits.

The invention is based on the recognition that at least one of the unused reserved bits of the signalling bits can be used to dynamically transmit data at a rate of one bit per frame period in addition to the existing static signalling bits.

Advantageously, the invention is used for conveying additional data indicating a level of violence and/or sex which can be used by a receiver to prevent children from seeing programs not intended for their eyes when the receiver is suitably programmed by a parent. This application of the invention is particularly useful, as the known aspect ratio signalling bit stream is designed such that it "survives" a recording operation on a video recorder, so that children are also prevented from viewing recorded programs which are not suitable for them.

Of course, also other types of additional data with a plurality of bits can be serially transmitted in one of the unused bits of the signalling bit stream. For example, a copy protection signal could be inserted in this manner. It is even possible to serially insert several types of additional data in the same bit of the signalling bit stream, each preferably preceded by labels indicating the type of additional data. For example, when two-bit labels are used, up to four different additional data signals can be distinguished.

These and other aspects of the invention will be apparent from and elucidated with reference to the embodiments described hereinafter.

DESCRIPTION OF THE PREFERRED EMBODIMENTS

Figure 1:
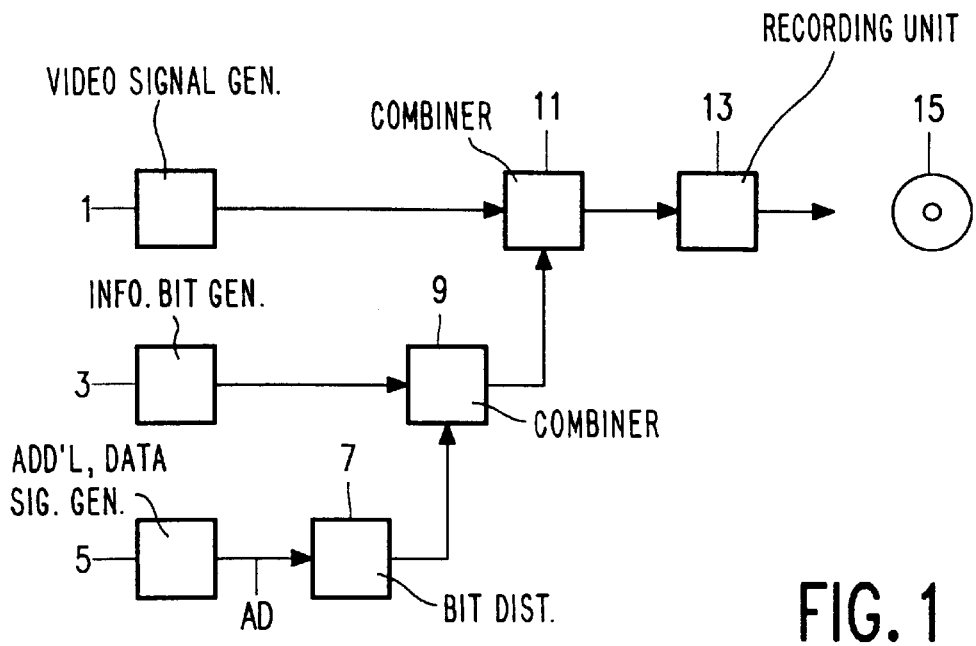
FIG. 1 shows an embodiment of an arrangement for generating a television signal with additional data.

The television signal generating arrangement of FIG. 1 comprises a device 1 for generating a video signal having at least luminance information. The device 1 may be a color television camera which also produces color difference and synchronization signals. The apparatus of FIG. 1 further comprises a device 3 for generating static control information bits relating to at least an aspect ratio of the video signal. For more details, reference is made to WO 94/28678 which discloses a prior art wide screen signalling bits generator. Device 5 provides an additional data signal having a plurality of bits. As mentioned above, the invention solves the problem of transmitting the additional data signal with its plurality of bits in such a manner that it remains reliable even after a recording operation on a conventional video recorder. To this end, a device 7 distributes the plurality of bits over at least one bit per frame of the video signal, so that it can be inserted into at least one bit position of the signalling bit stream which is not yet assigned to other purposes. Therefore, device 9 combines the static control information bits from the device 3 and the at least one bit from the device 7 to obtain a signalling bit stream containing at least one varying bit in addition to the static control information bits. Finally, device 11 combines the signalling bit stream from device 9 and the video signal from device 1 to obtain the television signal with additional data. Preferably, the signalling bit stream is inserted in a first half (more exactly, a little bit more than just the first half) of line 23 of each frame of the television signal as set out in WO 94/28678.

The television signal generating apparatus may also comprise a recording unit 13 for recording the television signal with the additional data on a recording medium 15. In the example shown in FIG. 1, the recording medium is formed by a disk 15 (CD-I, DVD) on which the television signal is optically stored. Of course, magneto-optical storage is also possible.

Figure 2:
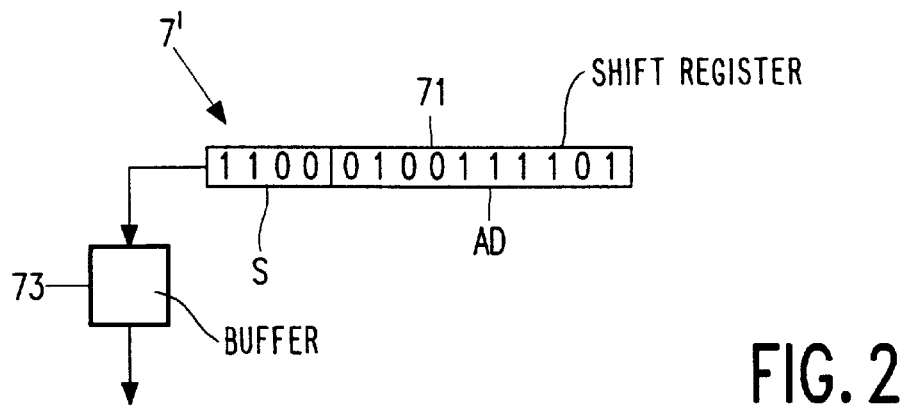
FIG. 2 illustrates an embodiment of a device for distributing a plurality of bits of the additional data over at least one bit per frame of the video signal.
Figure 3:
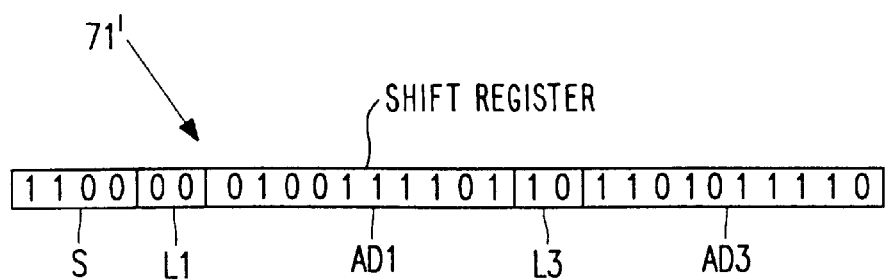
FIG. 3 shows an embodiment of a shift register for use in the embodiment of FIG. 2.

FIG. 2 illustrates one embodiment 7' of a device 7 for distributing a plurality of bits of the additional data over at least one bit per frame of the video signal. FIG. 2 shows a shift register 71 in which a 4bits sync word S (1100), and a 10-bits additional data signal AD (0100111101) is loaded. Via a buffer 73, the bits of the sync word and the additional data signal AD are supplied at a rate of one bit per frame, i.e. at a 25 Hz rate. This example holds for the situation that just one bit of the wide screen signalling bit stream is used for conveying an additional data signal. If more than one bit of the wide screen signalling bit stream is available for conveying additional data, more than one devices shown in FIG. 2 could be used in parallel. Alternatively, as shown in FIG. 3, a longer shift register embodiment 71' could be used in which, after the sync word S, up to four additional data signals AD1 . . . AD4 are loaded, each preceded by a respective label L1 . . . L4. In the example shown in FIG. 3, only labels L1 and L3 and corresponding additional data signals AD1 and AD3 are present.

As mentioned above, in a preferred application of the invention, the additional data signal indicates a level of violence and/or sex of the video signal. This offers the possibility that a parent programs his television set and/or his video tape recorder in such a manner, that only programs more innocent than a predetermined violence/sex level can be displayed or recorded, respectively. To this end, the television set and/or video recorder should have a device (in the newspapers, it is called a V-chip) responsive to the additional data to block normal operation of the television set or video tape recorder if a television signal containing more violence and/or sex than allowed by the parent is received. Of course, a video tape recorder is only mentioned as an example; optical recording devices could also be provided with such a V-chip. Also, video tape recorders and play-back devices for e.g., video tapes, CD-I, CD-Rom, and DVD discs, could be provided with such a V-chip, so that play-back of stored television signals containing more violence and/or sex than deemed suitable for the children can be prohibited.

In another preferred application, the additional data signal in the television signal is used to control both viewing the television signal when it is broadcast, and recording on a recording device so as to allow a refined copyright licensing program in which licenses are given for specific purposes. For example, the following four license classes could be distinguished:

1. The television signal can only be viewed if a license fee is paid, and it cannot be recorded.
2. The television signal can freely be viewed at the time when it is broadcast, but it cannot be recorded.
3. The television signal can freely be viewed and recorded once, but the recorded television signal cannot be copied.
4. The television signal can freely be viewed, recorded and copied.

Figure 4:
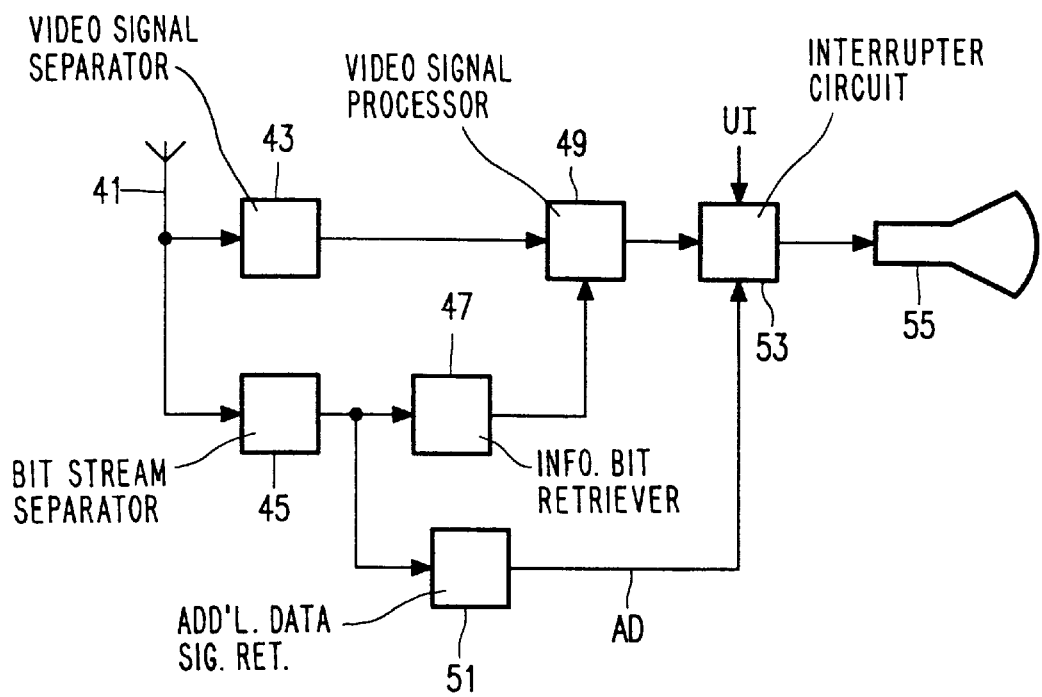
FIG. 4 shows an embodiment of an apparatus for receiving and processing a television signal with additional data.

FIG. 4 shows an embodiment of an apparatus for receiving and processing a television signal with additional data. The apparatus of FIG. 4 comprises an antenna 41 for receiving the television signal which includes a video signal having at least luminance information, and further, a signalling bit stream containing at least one varying bit in addition to static control information bits relating to at least an aspect ratio of the video signal. The at least one varying bit conveys an additional data signal having a plurality of bits distributed over the at least one varying bit per frame of said video signal, in the manner set out above. The receiving apparatus further comprises a device 43 for separating the video signal from the television signal, and a device 45 for separating the signalling bit stream from the television signal. A device 47 is connected to the device 45 for retrieving the static control information bits from the signalling bit stream to obtain control information. The control information from the device 47 is applied to a device 49 for processing the video signal from the device 43 in dependence upon the control information. For example, a horizontal compression is carried out when the control information indicates reception of a 4:3 aspect ratio signal while the display has a 16:9 aspect ratio. The receiving apparatus of FIG. 4 also has a device 51 for retrieving the additional data signal from the signalling bit stream supplied by the device 45 to obtain the additional data AD.

In a preferred application of the invention in which the receiving apparatus of FIG. 4 is a television receiver, the additional data AD is supplied to an interruption circuit 53 to interrupt transfer of the video signal from the device 49 to a display 55 when the additional data AD indicates that the television signal contains more violence and/or sex than allowed by a parent. To this end, the parent can input a maximum allowable level of violence and/or sex to a user input UI of the interruption circuit 53.

In another preferred application of the invention in which the receiving apparatus of FIG. 4 is a recording apparatus, the output of the interruption circuit 53 is connected to a recording unit (not shown) to prevent a recording operation when the additional data AD indicates that the television signal contains more violence and/or sex than allowed by a parent, or that recording of the television signal is not allowed for copyright reasons as discussed above.

Figure 5:
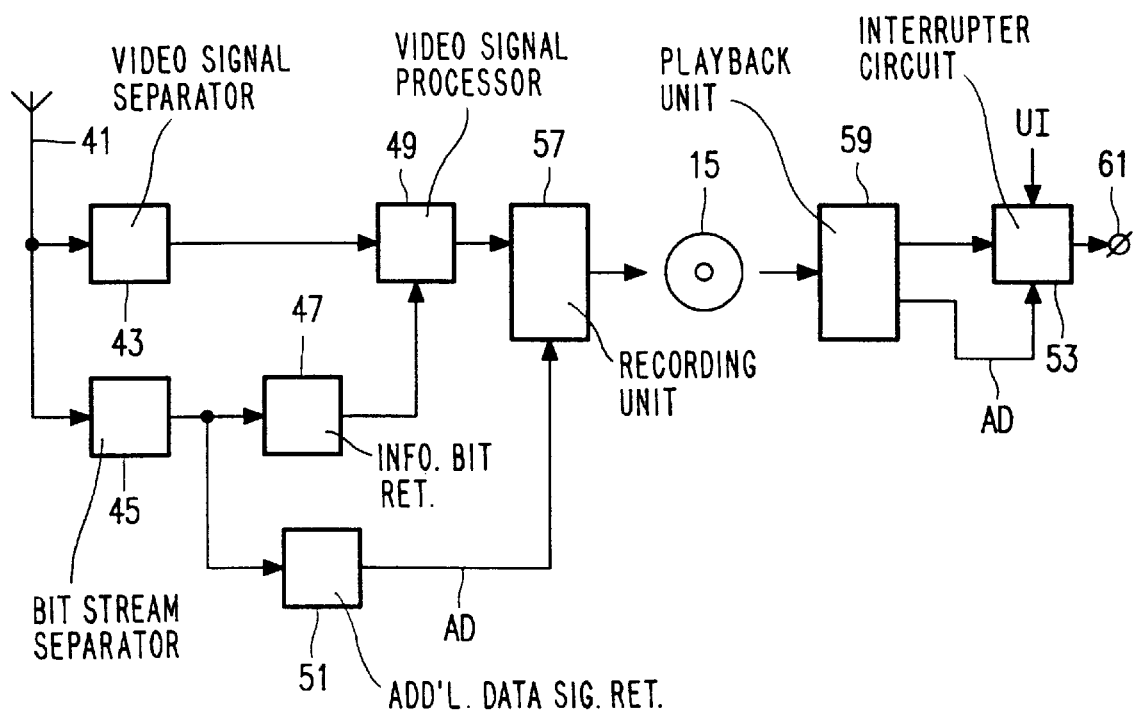
FIG. 5 shows an embodiment of a record/play back apparatus in accordance with the invention.

Alternatively, recording is allowed but play back is prohibited so as to allow adults to record television signals without running the risk that minors watch the recorded programs. In such a case, the video signal from the device 49 is recorded on tape together with the additional data AD, while upon play back, the recorded additional data AD is evaluated to decide whether the played back video signal can be transferred to the television set. FIG. 5 shows an embodiment of a record/play back apparatus in accordance with the invention. The elements 41–51 correspond to those shown in FIG. 4, and will not be discussed again. The processed video signal from the device 49 is applied to a recording unit 57 together with the additional data for recording of the video signal and the additional data AD on a recording medium 15. Upon play back, the stored information is retrieved from the recording medium 15 by a play back unit 59, and supplied to an output 61 of the apparatus of FIG. 5 thru the interruption circuit 53 which is controlled by the additional data AD which is also retrieved from the recording medium 15. Preferably, the television signal supplied at the output 61 contains the signalling bit stream with the additional data in accordance with the present invention. Of course, a play-back apparatus without recording facilities in accordance with the invention like, for example, a modified CD-I player, would only contain the elements 59 and 53.

The television signal according to the invention can be stored by conventional recorders, which would just leave the signalling bit stream with the additional data in line 23 of the video signal. Upon play back, the additional data would still be in the video signal and is suitable for evaluation by the play back, device itself or by a television display apparatus in accordance with the present invention. In a play back, device according to the invention, the play back, unit 59 includes the units 43–51, a pick-up head carrying out a receiving function corresponding to that of antenna 41.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer. A television signal, as discussed in this specification, does not need to be a broadcast television signal, for example, a television signal distributed over storage means, like video tapes, computer disks, CD-ROMs, CD-Is and/or Digital Video Discs (DVD), would be perfectly possible. A video signal as discussed in this specification does not need to have been picked up by a camera; it may have been artificially generated like in a computer game. While separate devices are shown in an embodiment, a combined device is often possible. For example, in FIG. 1, devices 9 and 11 may be replaced by a single device. Similiarly, a single combining method step falls within the scope of the claims. Moreover, in FIGS. 4, 5, instead of the separate separation devices 43, 45, a combined separation device is possible which separates the video signal and the signalling bit stream in a single method step from the received television signal; this also falls within the scope of the claims. Also within the scope of the claims is a single retrieving device replacing the separate retrieving devices 47, 51 shown in FIGS. 4, 5. Obviously, the bits distributed by the device 7 may have been protected by an error protection code, like, e.g., a repetition code allowing a majority decision at the receiving/play back end.

What is claimed is:

1. A method of generating a television signal with additional data, comprising the steps:

generating a video signal having at least luminance information;

generating control information in the form of information bits for transmission with each frame of said video signal, said control information describing features of the video signal for controlling a display of said video signal;

providing an additional data signal having a plurality of bits;

distributing said plurality of bits over at least one bit per frame of said video signal;

combining said information bits and said at least one bit to form a bit stream containing at least one varying bit in addition to said information bits for each frame of the video signal; and combining said bit stream and said video signal to form said television signal with additional data.

2. A method as claimed in claim 1, wherein said distributing step comprises the steps:

providing a sync word; and serially inserting bits of said sync word and said additional data signal into said at least one bit of said bit stream per frame of said video signal.

3. A method as claimed in claim 1, wherein the additional data signal indicates a level of violence and/or sex.

4. A method of generating a television signal with additional data, comprising the steps:

generating a video signal having at least luminance information;

generating information bits;

providing an additional data signal having a plurality of bits;

distributing said plurality of bits over at least one bit per frame of said video signal;

combining said information bits and said at least one bit to obtain a bit stream containing at least one varying bit in addition to said information bits; and combining said bit stream and said video signal to obtain said television signal with additional data, wherein said distributing step comprises the steps:

providing a sync word; and serially inserting bits of said sync word and said additional data signal into said at least one bit of said bit stream per frame of said video signal, and wherein there are at least first and second additional data signals, and said inserting step comprises the steps:

providing separate label bit sequences for each of said at least first and second additional data signals; and inserting, after said sync word, at least a first label bit sequence followed by bits of said first additional data signal and a second label bit sequence followed by bits of said second additional data signal, into said at least one bit of said bit stream per frame of said video signal.

5. A television signal with additional data modulated on a television carrier wave, said television signal comprising:

a video signal having at least luminance information and a bit stream for conveying information bits in each frame of the video signal, said information bits forming control information describing features of the video signal for controlling a display of the video signal; and a plurality of bits of an additional data signal distributed over at least one bit of said bit stream per frame of said video signal, whereby said bit stream contains at least one varying bit of said additional data signal in addition to said information bits in each frame of the video signal.

6. A storage medium having stored therein the television signal with additional data modulated on a television carrier wave as claimed in claim 5.

7. An apparatus for generating a television signal with additional data, comprising:

means for generating a video signal having at least luminance information;

means for generating control information in the form of information bits for transmission with each frame of said video signal, said control information describing features of the video signal for controlling a display of said video signal;

means for providing an additional data signal having a plurality of bits;

means for distributing said plurality of bits over at least one bit per frame of said video signal;

means for combining said information bits and said at least one bit to form a bit stream containing at least one varying bit in addition to said information bits for each frame of the video signal; and means for combining said bit stream and said video signal to form said television signal with additional data.

8. A method of receiving and processing a television signal with additional data, comprising the steps:

receiving said television signal including a video signal having at least luminance information and a bit stream containing at least one varying bit in addition to information bits, said at least one varying bit conveying an additional data signal having a plurality of bits distributed over said at least one varying bit per frame of said video signal;

separating said video signal from said television signal;

separating said bit stream from said television signal;

retrieving said information bits from said bit stream to obtain control information;

processing said video signal in dependence upon said control information; and retrieving said additional data signal from said bit stream to obtain said additional data.

9. An apparatus for receiving and processing a television signal with additional data, comprising:

means for receiving said television signal including a video signal having at least luminance information and a bit stream containing at least one varying bit in addition to information bits, said at least one varying bit conveying an additional data signal having a plurality of bits distributed over said at least one varying bit per frame of said video signal;

means for separating said video signal from said television signal;

means for separating said bit stream from said television signal;

means for retrieving said information bits from said bit stream to obtain control information;

means for processing said video signal in dependence upon said control information; and means for retrieving said additional data signal from said bit stream to obtain said additional data.

10. An apparatus as claimed in claim 9, wherein said video signal processing means include means for processing said video signal further in dependence upon said additional data.

11. An apparatus as claimed in claim 10, wherein said video signal processing means include means for disabling display of said video signal when said additional data indicate a level of violence and/or sex not permitted by a user.

12. An apparatus as claimed in claim 10, wherein said video signal processing means include means for disabling recording of said video signal when said additional data indicate that recording is not allowed.

13. An apparatus as claimed in claim 10, wherein said apparatus comprises means for playing back said television signal from a recording medium, and said video signal processing means include means for disabling transfer of at least said luminance information from said recording medium to a display device.

* * * * *